United States Patent [19]

Masaki

[11] Patent Number: 5,023,992

[45] Date of Patent: Jun. 18, 1991

[54] CABLE LOADING MACHINE

[75] Inventor: Takashi Masaki, Tokyo, Japan

[73] Assignee: Hirose Electric Co., Ltd., Tokyo, Japan

[21] Appl. No.: 611,050

[22] Filed: Dec. 28, 1990

[30] Foreign Application Priority Data

Nov. 17, 1989 [JP] Japan .................................. 1-297712

[51] Int. Cl.[5] ......................... B23P 19/00; B23P 21/00

[52] U.S. Cl. ......................................... 29/705; 29/593; 29/753; 29/857

[58] Field of Search ................. 29/753, 742, 748, 705, 29/593, 857

[56] References Cited

U.S. PATENT DOCUMENTS 4,426,772 1/1984 Collier et al. ......................... 29/753

4,493,147 1/1985 Bakermans ............................ 29/748

4,912,823 4/1990 Shah et al. ............................ 29/748

4,974,311 12/1990 Tran ..................................... 29/753

FOREIGN PATENT DOCUMENTS 1398008 5/1988 U.S.S.R. ................................ 29/753

*Primary Examiner*—P. W. Echols

*Attorney, Agent, or Firm*—Kanesaka & Takeuchi

[57] ABSTRACT

A cable loading machine for connecting a plurality of insulated conductors of a multiconductor cable to terminals of a connector one at a time, which includes a conductor separation unit (D) having a conductor separation assembly (3) with a conductor receptor (6) sufficiently large to receive separated conductors; a conductor pressure unit (L) for applying a pressure on the conductors in the conductor separation assembly in a direction from a conductor inlet (6*a*) to a conductor outlet (6*b*); a conductor separation member (14) having a row of teeth with conductor receiving channels (a) therebetween and laterally movable over the conductor outlet for inserting the conductors pushed out of the outlet into the conductor receiving channels one at a time and positioning the inserted conductors on an outlet side of the conductor receiving channels; a probe unit (E) having probing pins (25) for contact with the separated conductors to identify line pairs and line numbers; and a conductor push up unit (F) for pushing up the conductor from the conductor outlet to the conductor inlet to transfer it to a gripping unit.

1 Claim, 18 Drawing Sheets

FIG. 22

CABLE LOADING MACHINE

BACKGROUND OF THE INVENTION

1. Field of the Invention

The present invention relates to machines for loading multiconductor cables on connectors and, more particularly, to a machine for loading the individual conductors of a multiconductor cable to the terminals of a connector by the insulation displacing technique.

2. Description of the Prior Art

As FIG. 29 shows, the identification of a line number has been made by first connecting one end of a conductor b of a cable a to a connector c; connecting the connector c to a line number identifier d; and contacting the other end of the conductor b to a probe e of the identifier d.

If both of the cable ends are to be connected to connectors, it is possible to connect the connector c to the conductor b irrespective of the color or mark of the conductor b because it is possible to connect the other connector to the right conductor b with the aid of the line number identifier d. However, if a cable is composed of line pairs, it is necessary to identify the line pairs for making right connection. Thus, a master connector connected to one end of a cable is connected to a line number identifier to detect the line number for connection by insulation displacement technique for example. After all of the conductors are connected, the cable is cut to a predetermined length. Thus, in the above loading method, it is possible to take the line pairs combination into consideration.

However, in the above loading method, it is necessary to perform the cable termination, connection, and cutting operations in sequence so that it is difficult to speed up only the connection machine. In addition, when the loading machine is introduced into the conventional manual loading process, it is necessary to change the process steps before and after the loading machine. Thus, there is a need for a line pairs identifier able to perform line pairs identification after a predetermined length of cable is cut off. Such a line pairs identifier has a function of identifying the combination of line pairs (line pairs identification function) and a function of matching the line number to that of the connector which has been connected to the cable (line number matching function).

As FIG. 30 shows, the line pairs identification is effected by connecting all of the conductors b of a cable a to the probes e and leaving the other ends open.

As FIG. 31 shows, the line number matching is effected by connecting a terminal device i to a connector c. It is unnecessary to connect the terminal device i to the line pairs identifier j with a signal line.

Japanese Patent Application Kokai No. 62-82681 discloses a cable loading machine, wherein individual insulated conductors of a multiconductor cable are arranged in a random conductor holder in a row and connected to a line number identifier via a detector and a cord to form a closed loop for identifying and storing the arrangement order and the line numbers of individual conductors. Then, in response to instructions from the line number identifier, the manipulator picks up the insulated conductors one at a time from the random conductor holder. The conductivity of the picked conductor is read again to confirm the line number by the line number identifier. If there is no error, the manipulator is moved toward an arranged conductor holder to insert the insulated conductor into the conductor supporting portion of a combed conductor jig corresponding to the connection terminal of a flat connector.

With the above automatic cable loader, it is necessary to arrange the individual conductors of a multiconductor cable on a random conductor holder one at a time, identifying and storing the arrangement order of the conductors with the line number identifier, and picking them up one at a time while reading the conductivity of the insulated conductor again to confirm it with the line number identifier so that it has been difficult to improve the productivity.

SUMMARY OF THE INVENTION

Accordingly, it is an object of the invention to provide an automatic cable loading machine with the improved productivity by simplifying the operation from the conductor separation to butch contact by the probes.

According to the invention there is provided a cable loading machine for connecting a plurality of insulated conductors of a multiconductor cable to a plurality of terminals of a connector one at a time, which includes a conductor separation unit having a conductor separation assembly with a gap sufficiently large to receive separated conductors; a conductor pressure unit for applying a pressure on the conductors within the conductor separation assembly in a direction from a conductor inlet to a conductor outlet; a conductor separation member having a row of teeth with conductor receiving channels therebetween and laterally movable below the conductor outlet for receiving the conductors pushed out of the conductor outlet into the conductor receiving channels one at a time and positioning the inserted conductors on an exist side of the conductor receptor when moved to a retreated position; a probe unit having probing pins for contact with the separated conductors to identify line pairs and line numbers; and a conductor push up unit for pushing up the conductor from the conductor outlet to the conductor inlet to transfer it to a gripping unit.

According to the invention, the individual conductors of a multiconductor cable are inserted into the conductor receptor of a conductor separation unit through the conductor inlet and pushed toward the conductor outlet by the conductor pressure unit. By moving the conductor separation member in the separation direction, the conductors are pushed from the conductor outlet into the receiving channels one at a time for effecting conductor separation. The probe pins are brought into contact with the separated conductors to identify the line pairs and line numbers. By retreating the conductor separation member, the conductors are positioned on the outlet side of the conductor receptor and pushed up by the conductor push up unit toward the conductor inlet so that they are transferred to the gripping unit.

The above and other objects, features, and advantages of the invention will be apparent from the following description when taken in conjunction with the accompanying drawings.

DESCRIPTION OF THE PREFERRED EMBODIMENT

FIGS. 1–4 show a cable loading machine according to an embodiment of the invention, which includes a machine body 1; a connector cable set unit A; a movable header unit B; and a header drive unit C. The connector cable set unit A has a set table 2 which is able to be pulled out of the lower front portion of the machine body 1.

Figure 5:
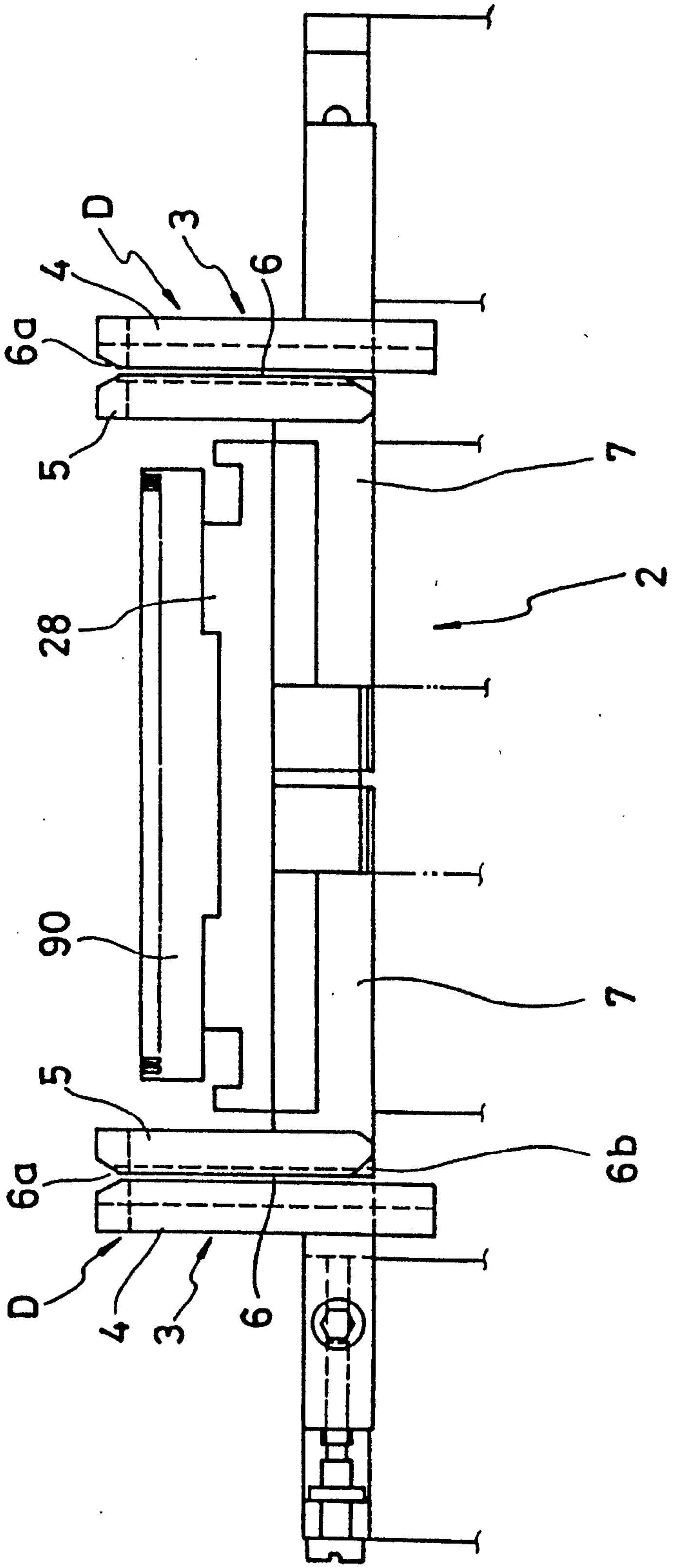
FIG. 5 is a front elevation of a connector cable set unit of the cable loading machine.
Figure 6:
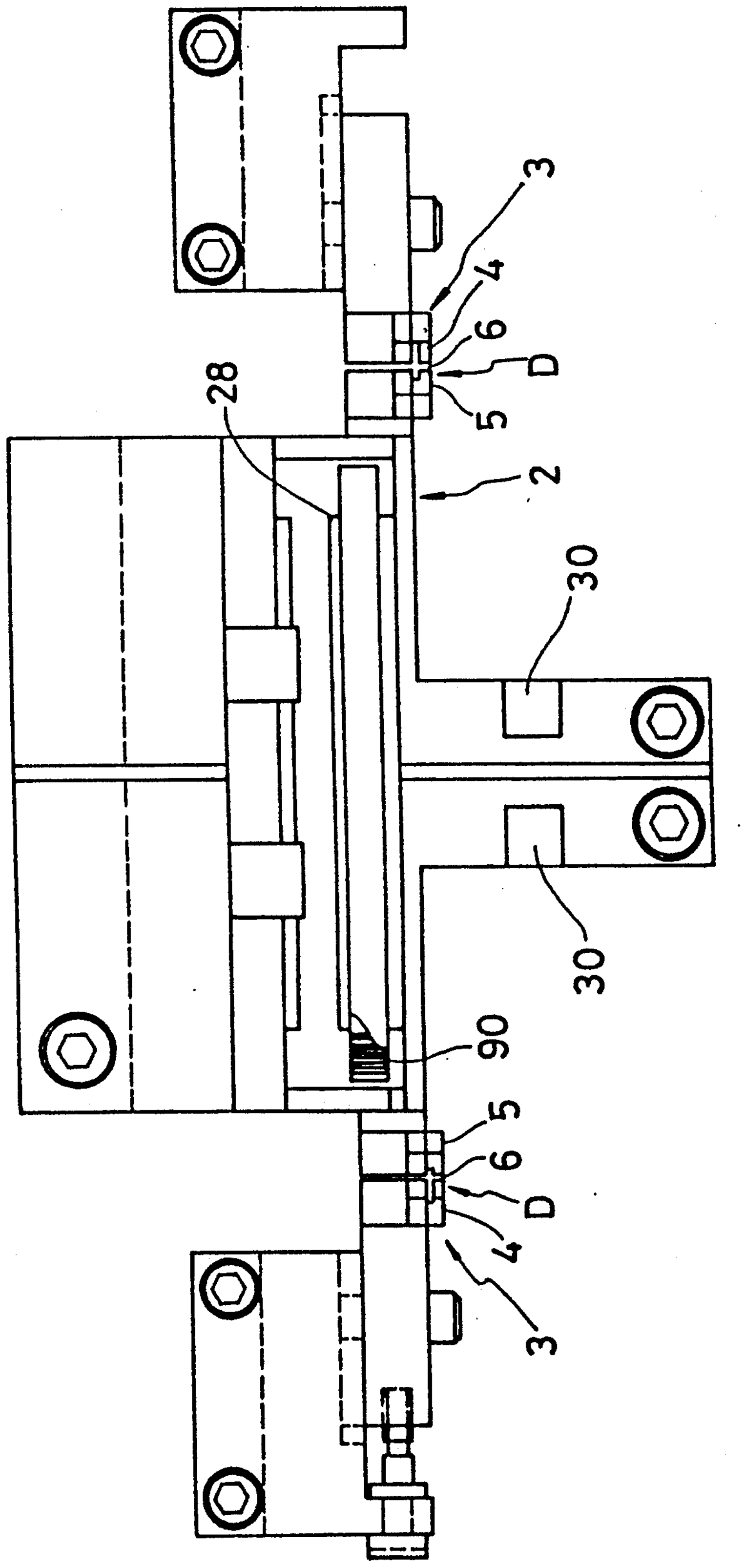
FIG. 6 is a top plan view thereof.

As FIGS. 5–6 show, a pair of conductor separation units D are provided on opposite sides of the set table 2. The conductor separation unit D includes a conductor separation assembly 3 which is composed of a pair of separation members 4 and 5. These separation members define a conductor receptor 6 with a top V-shaped guide 6*a* or conductor inlet. The inner separation member 5 has a lateral portion 7 and a lower guide 6*b* or conductor outlet at the corner.

Figure 7:
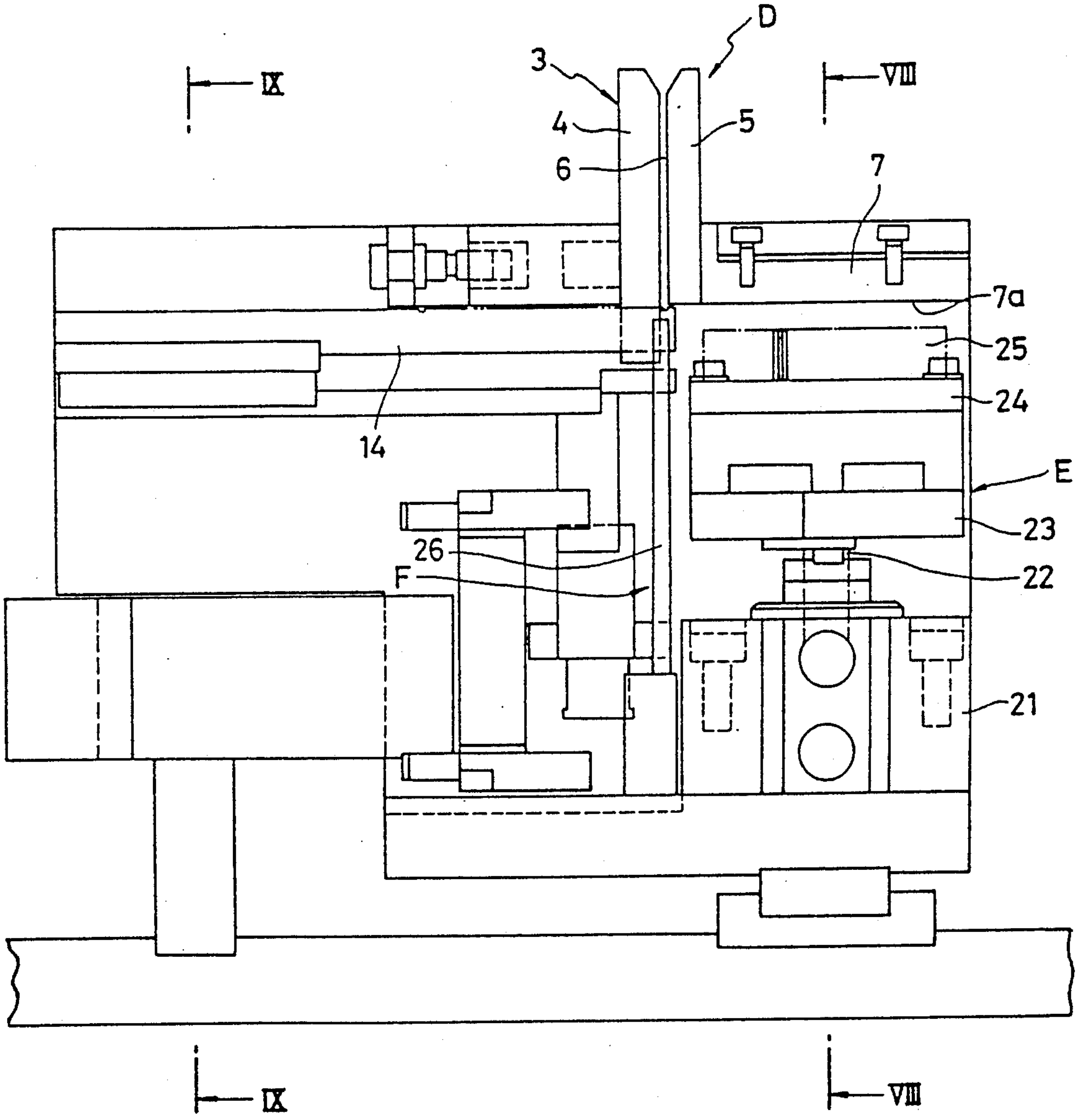
FIG. 7 is a front elevation of a conductor separation unit of the cable loading machine.
Figure 8:
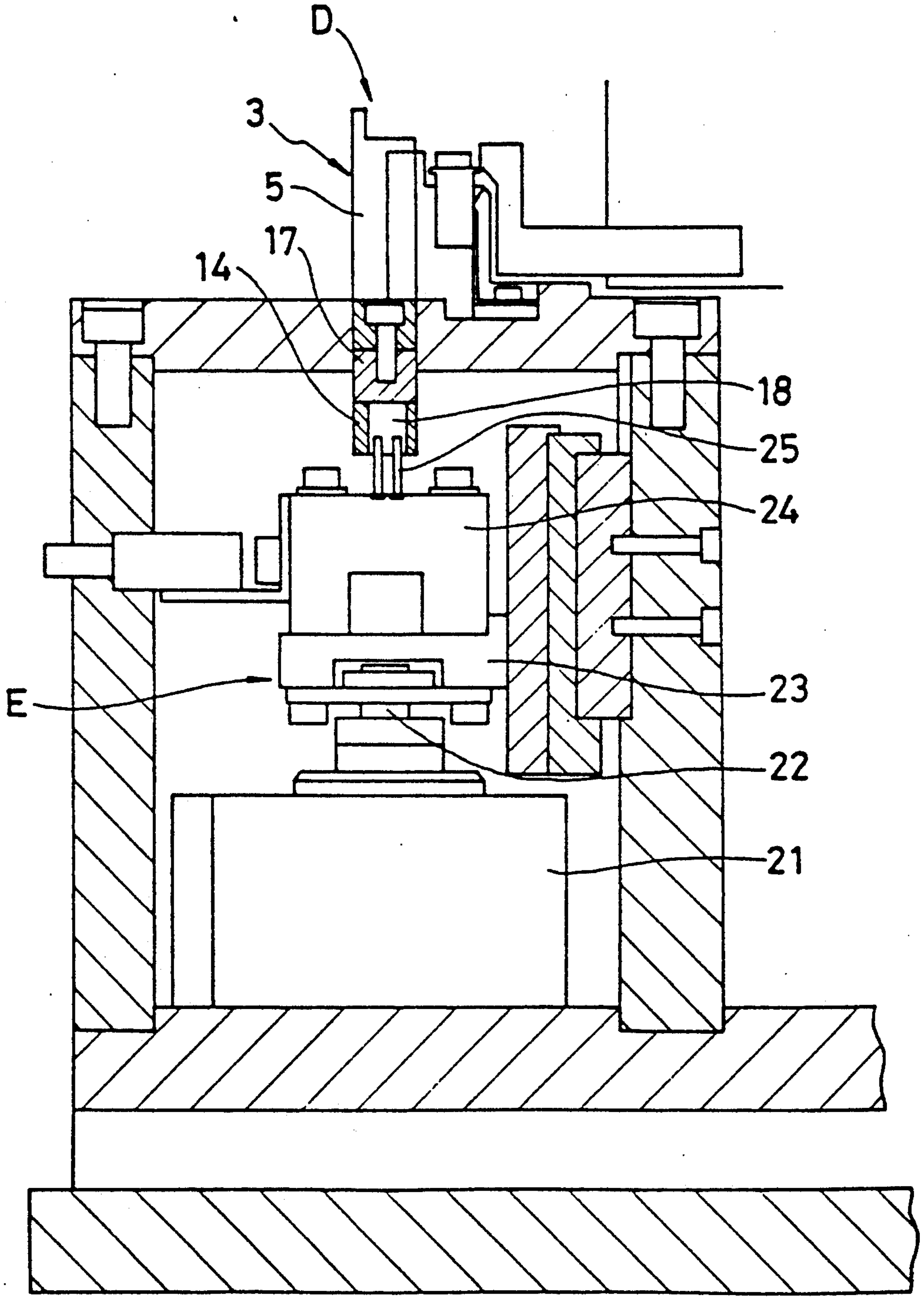
FIG. 8 is a sectional view taken along the line VIII—VIII of FIG. 7.
Figure 9:
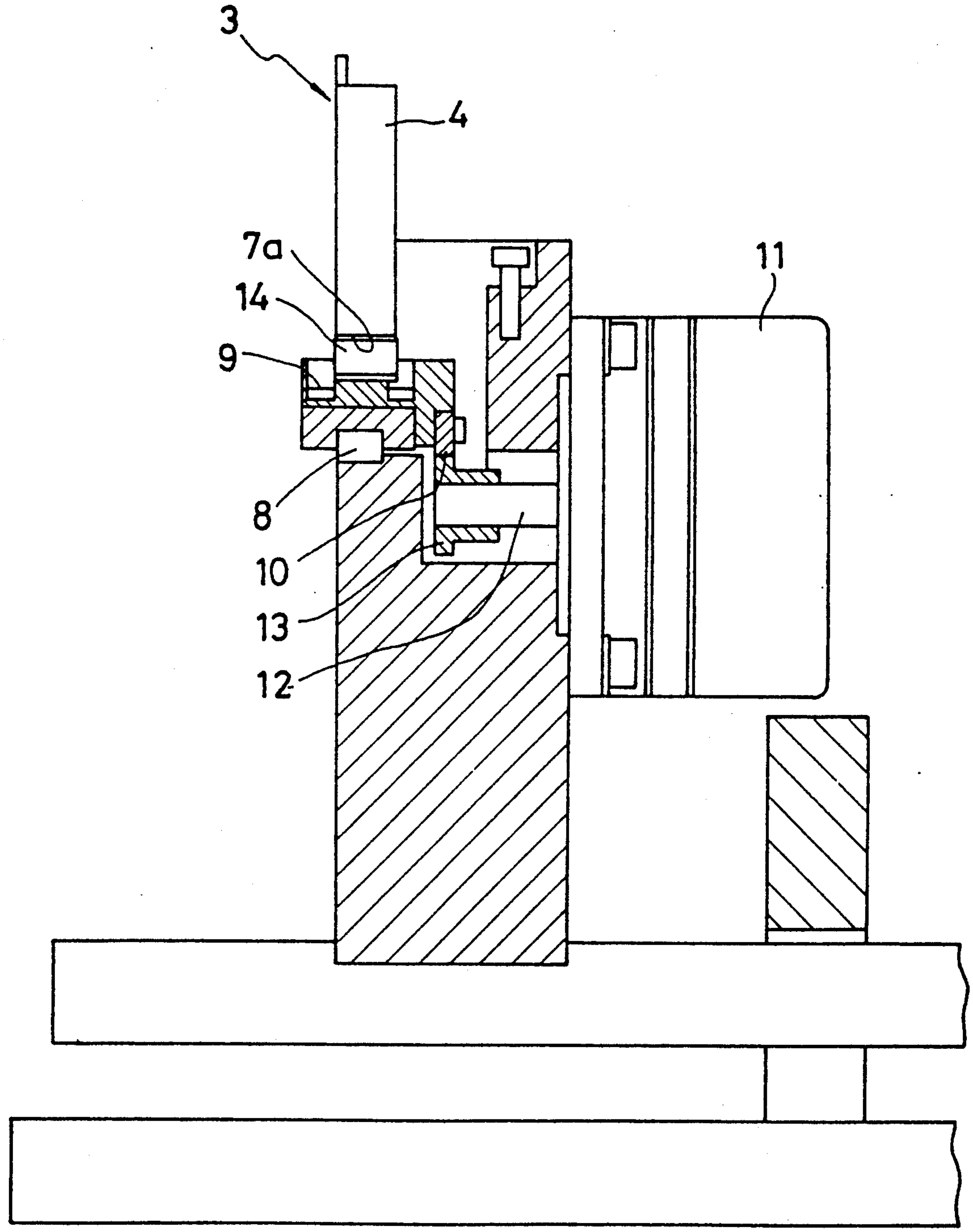
FIG. 9 is sectional view taken along the line IX—IX of FIG. 7.

As FIGS. 7–9 show, a pair of rails 8 are provided on opposite sides of the set table 2. A comb carrier 9 is movable on the rail 8, and a rack 10 is secured to the comb carrier 9. A drive motor 11 is secured to the set table 2, and a pinion 13 is secured to the output shaft 12 for mesh with the rack 10. A comb 14 is mounted on the carrier 9 for separation of individual conductors.

Figure 10:
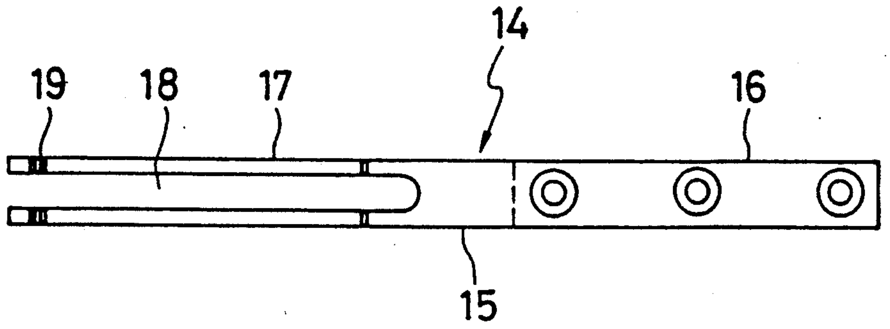
FIG. 10 is a top plan view of a conductor separation comb of the cable loading machine.
Figure 11:
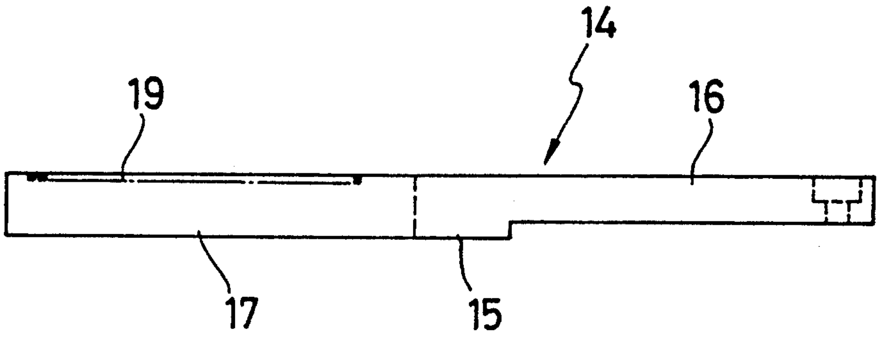
FIG. 11 is a front elevation thereof.
Figure 12:
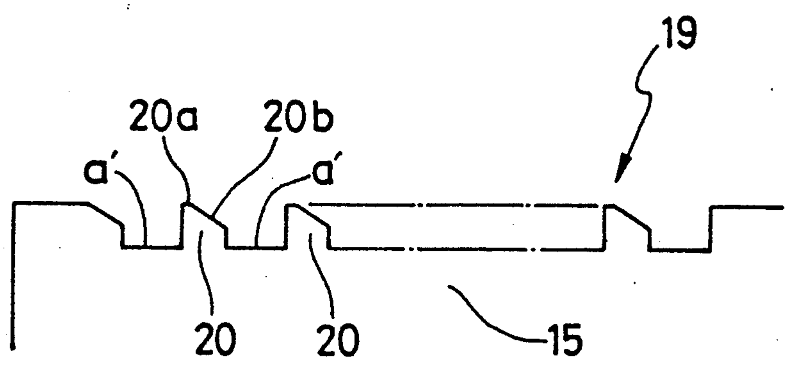
FIG. 12 is a front elevation showing teeth of the conductor separation comb.

FIGS. 10–11 show the comb 14 which has a comb body 15 consisting of an attaching portion 16 and a tooth portion 17. The tooth portion 17 has a pair of toothed strips 19 and a split groove 18. As FIG. 12 shows, the top face of a tooth 20 has a flat face 20*a* and an inclined face 20*b*.

Figure 23:
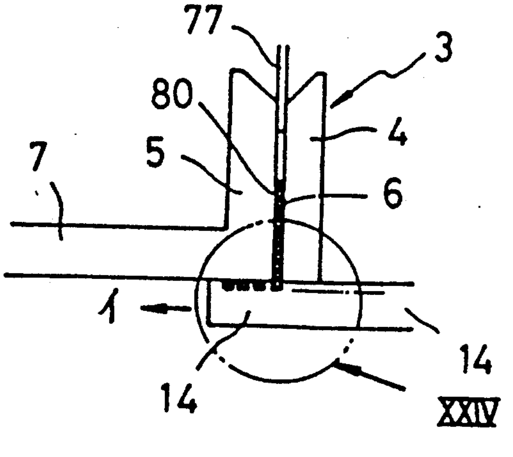
FIG. 23 is a front elevation thereof.
Figure 24:
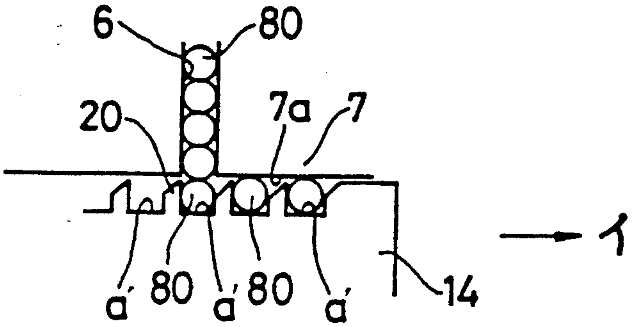
FIG. 24 is an expanded view of XXIV of FIG. 23.

As FIGS. 23 and 24 show, all of the inclined faces 20*b* are aligned in the same direction opposite to the direction that the comb 14 is moved for separating the conductors as indicated by an arrow ( ⅄ ). Thus constructed conductor separation comb 14 is attached to the carrier 9 with the attaching portion 16 so that the toothed strips 19 are movable below the separation members 4 and 5. When the separation comb 14 is moved in the separation direction ( ⅄ ), the flat faces 20*a* of teeth 20 slide on the bottom face 7*a* of a lateral portion 7 of the separation member 5.

As FIGS. 7 and 8 show, a probe unit E is provided below the separation assembly 3 of the separation unit D. The probe unit E includes a drive cylinder 21 having a piston rod 22 attached to a header 23. A probe 24 is mounted on the header 23 and has probe pins 25 which are equal in number to the conductors of a cable. These probe pins 25 enter the split groove 18 of the separation comb 14 when the header 23 is raised. A pair of push up units F are provided below the conductor separation units D. The push up unit F includes a push up plate 26 and a reciprocator (not shown) for moving up and down the push up plate 26. When raised, the push up plate 26 enters the conductor receptor 6 between the separation members 4 and 5.

Figure 27:
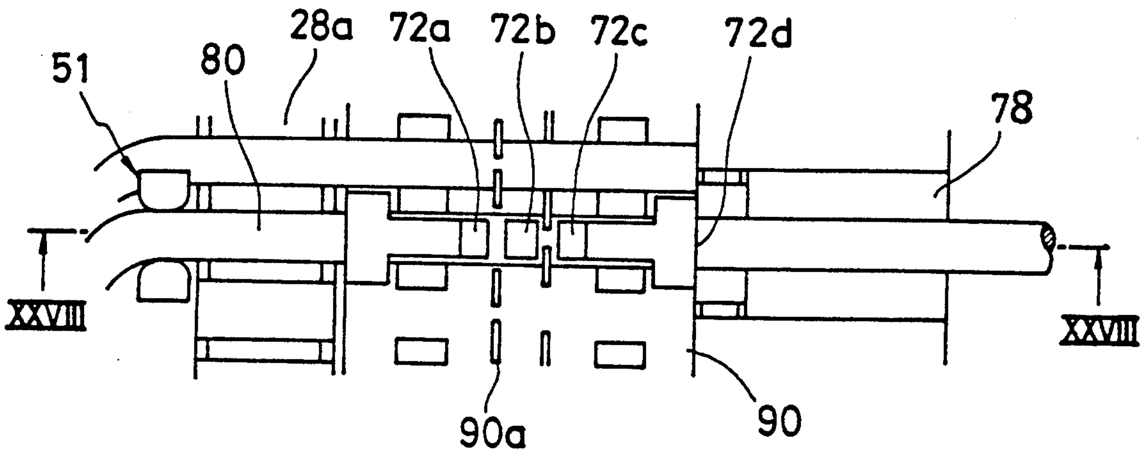
FIG. 27 is a top plan view showing the connection by insulation displacement of a conductor by the insulation displacement blade.
Figure 28:
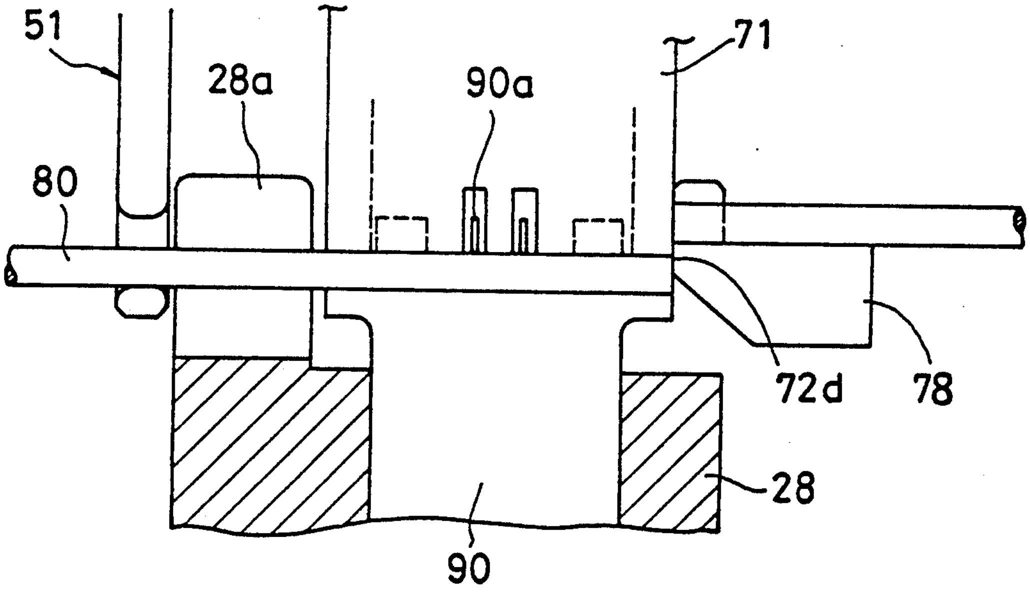
FIG. 28 is a sectional view taken along the line XXVIII-XXVIII of FIG. 27.
Figure 29:
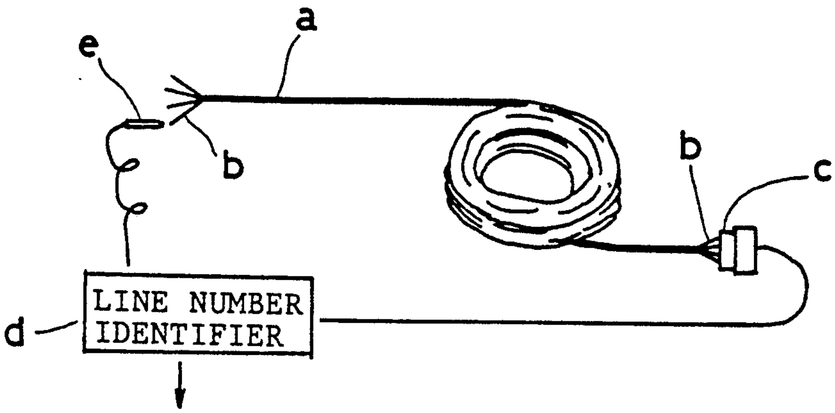
FIG. 29 PRIOR ART
FIG. 29 illustrates how to identify the line number with a conventional, line number identifier.

As FIGS. 5 and 6 show, a connector base 28 is mounted on the set table 2 between the conductor separation units D. As FIGS. 27 and 28 show, a conductor guide 28*a* is mounted on the top of the connector base 28. A pair of cable clampers 30 are attached to the set table 2 in front of the connector base 28.

Figure 1:
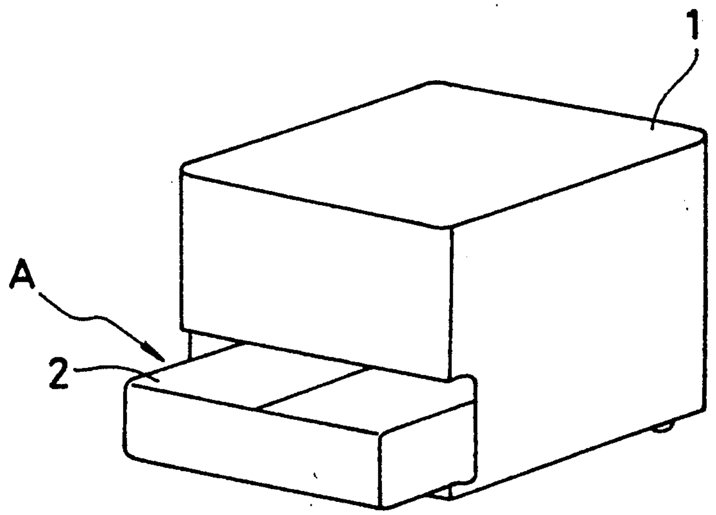
FIG. 1 is a perspective view of a cable loading machine according to an embodiment of the invention.
Figure 2:
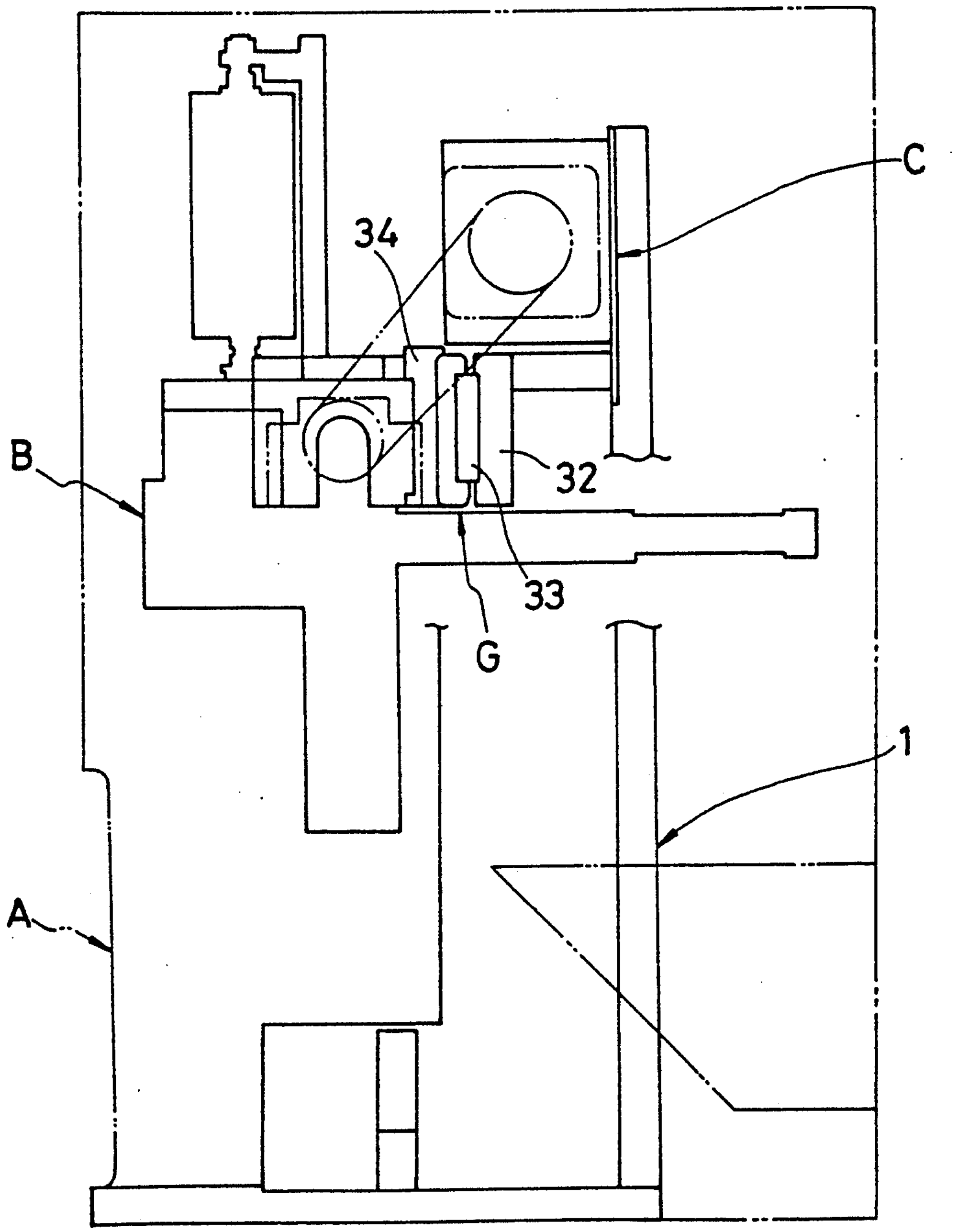
FIG. 2 is a side elevation thereof.
Figure 3:
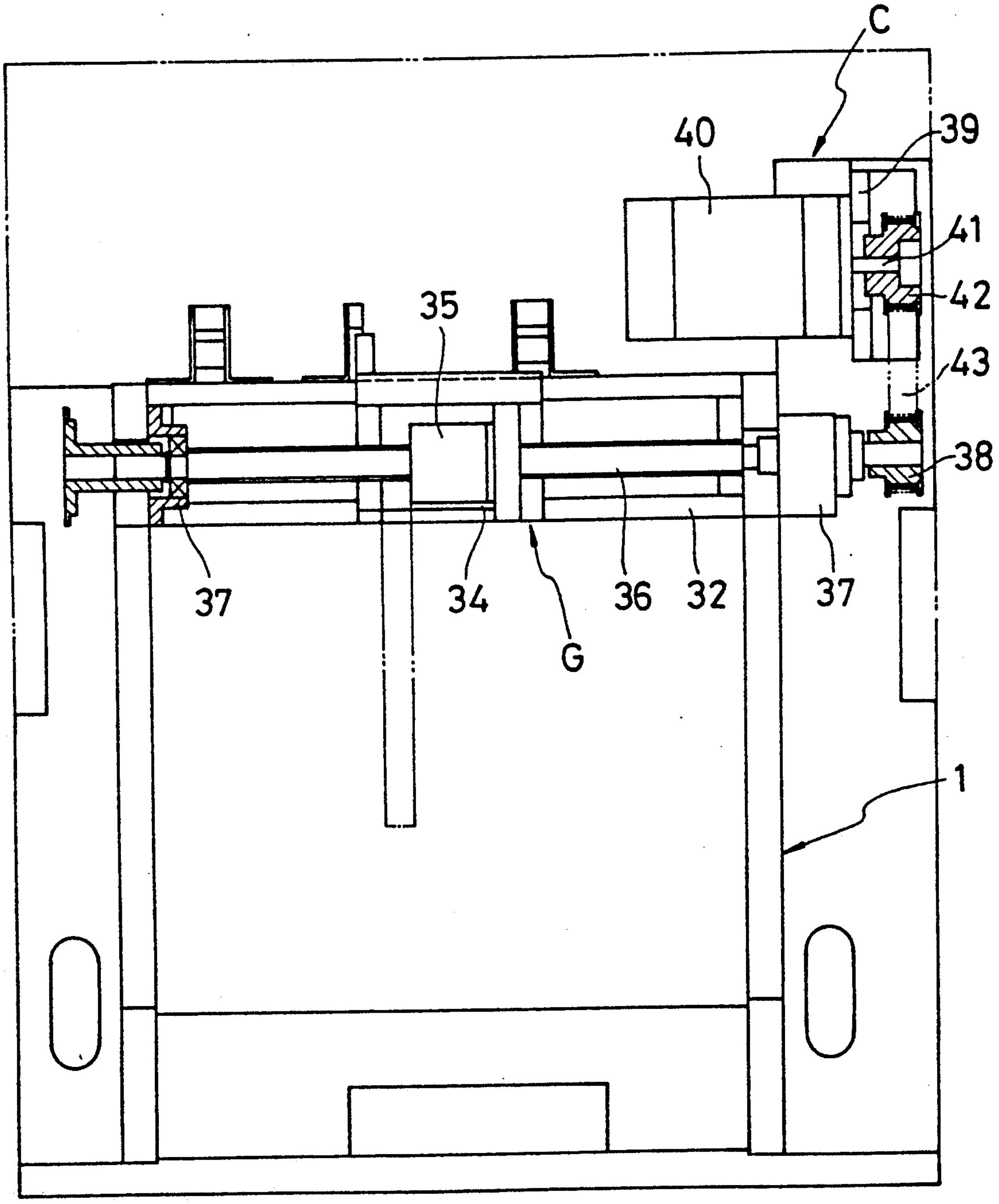
FIG. 3 is a front elevation of a header drive unit of the cable loading machine.
Figure 4:
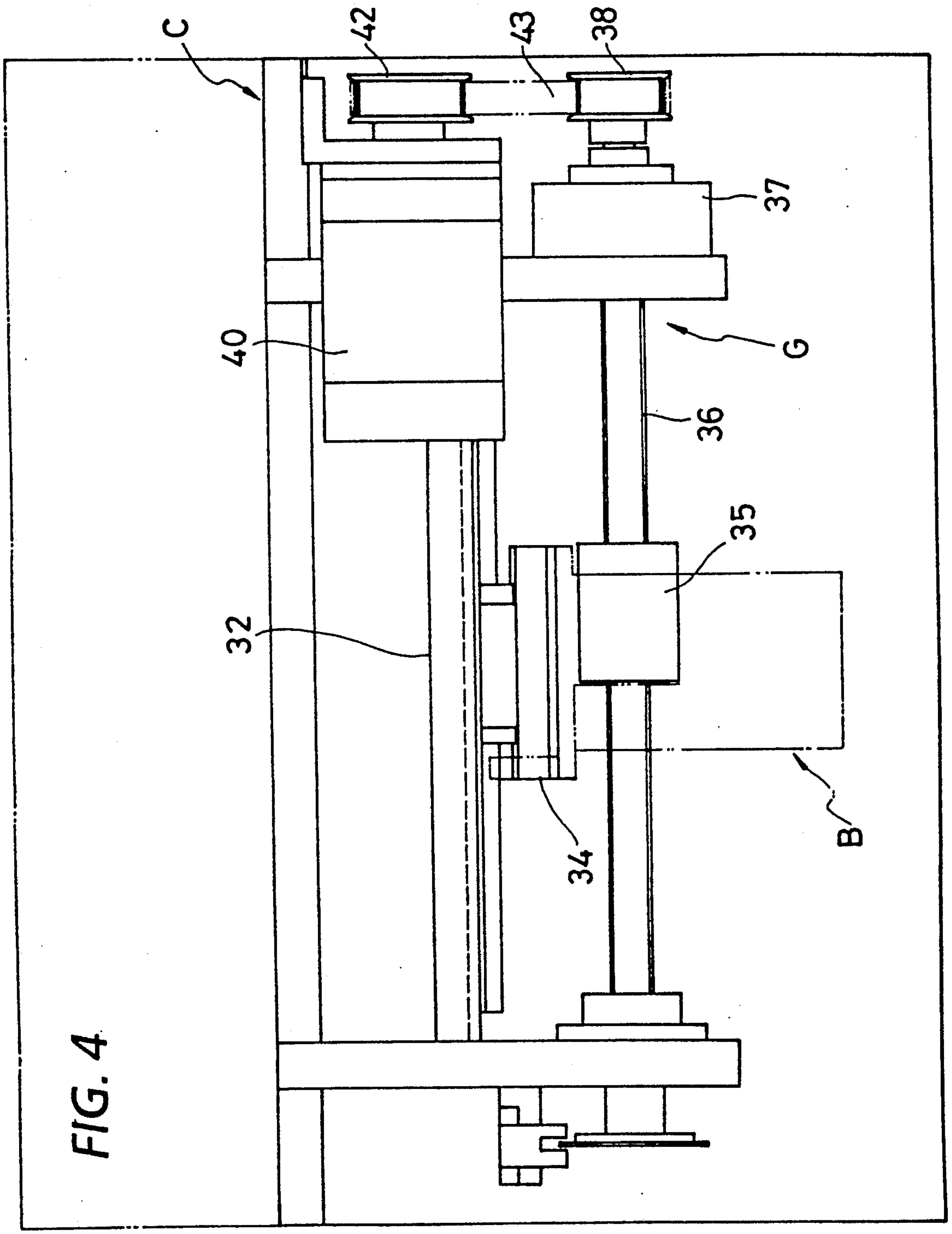
FIG. 4 is a top plan view thereof.

As FIGS. 2–4 show, a lateral conveyer unit G is provided for the head drive unit C. The lateral conveyer unit G includes a lateral rail 32 to which the movable header unit B is mounted via a linear bearing 33. The movable header unit B has a nut member 35 into which a threaded rod 36 is screwed. The threaded rod 36 is supported on bearings 37 on opposite sides of the machine body 1. A pulley 38 is secured to the right-hand end of the threaded rod 36. A drive motor 40 is mounted on the upper portion of the machine body 1 via a support member 39. A pulley 42 is attached to an output shaft 41 of the drive motor 40, and an endless belt 43 is put on the pulleys 42 and 38.

Figure 13:
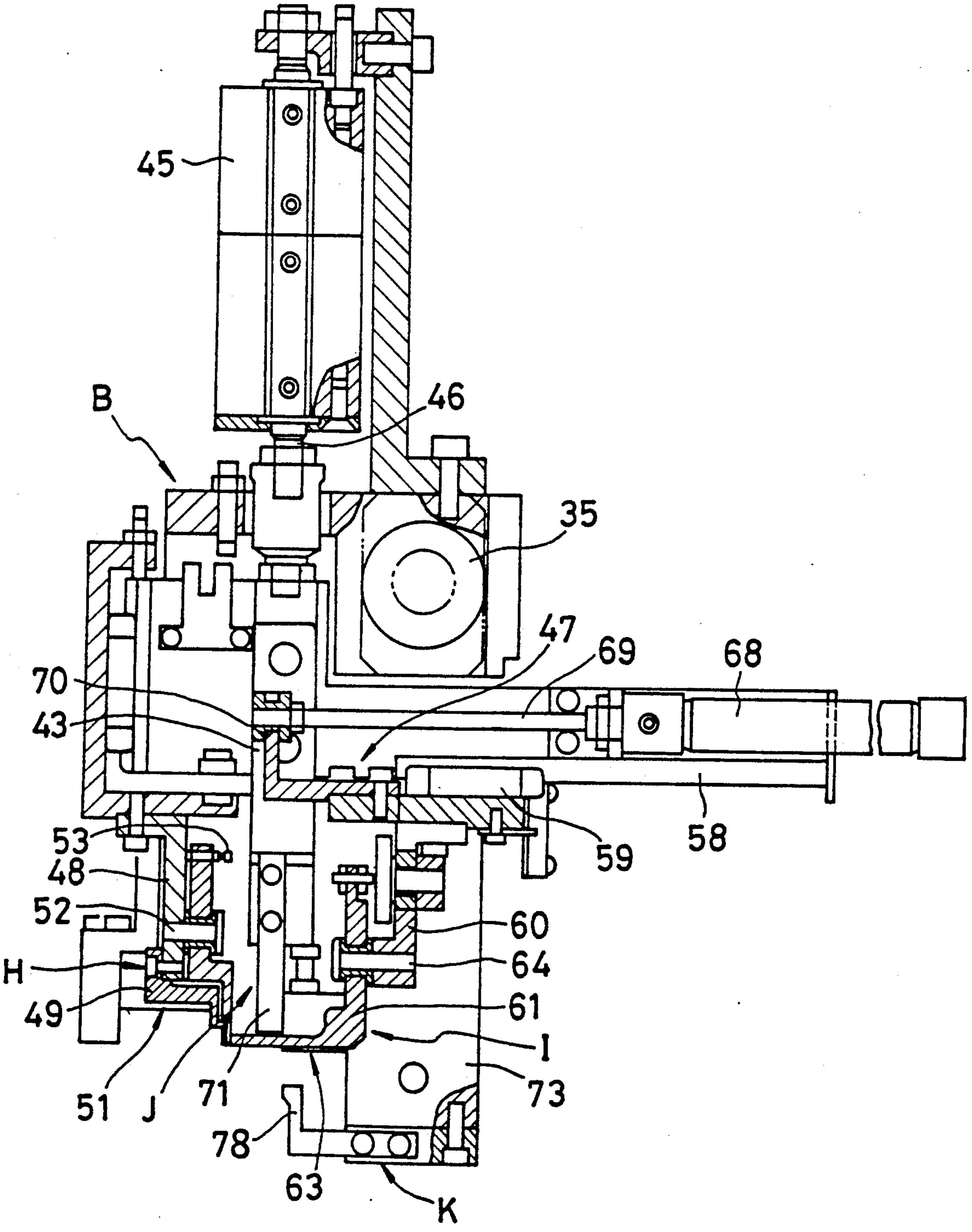
FIG. 13 is a side elevation, partly in section, of a movable header of the cable loading machine.
Figure 14:
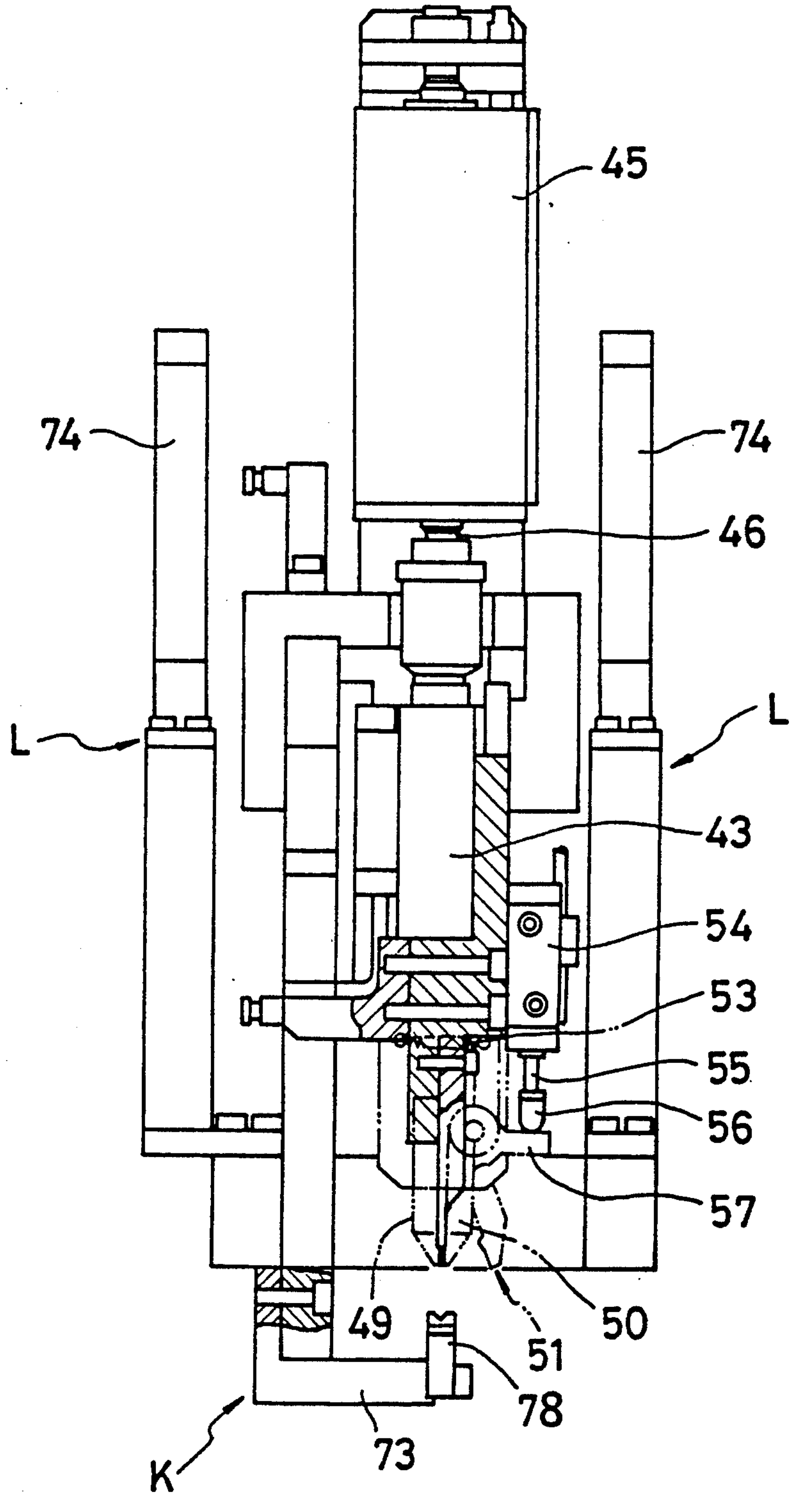
FIG. 14 is a front elevation, partly in section, thereof.

As FIGS. 13 and 14 show, a reciprocating cylinder 45 attached to the movable header unit B has a piston rod 46 attached to an insulation displacing unit 47. The insulation displacing unit 47 includes a positioning unit H, a stretching unit I, and an insulation displacing unit J. The positioning unit H includes a holder 48 secured to the unit body 43 and a positioning assembly 51 consisting of a fixed finger 49 and a movable finger 50 which is attached to the holder 48. The movable finger 50 is pivoted at the intermediate portion to the holder 48 with a pin 52 and linked at the upper end to the holder 48 via a spring 53. A finger drive cylinder 54 is secured to the unit body 43 and has a piston rod 55 with a pusher 56 at its free end. The pusher 56 abuts on the arm portion 57 of the movable finger 50.

The stretching unit I includes a rail member 58 extending rearwardly from the unit body 43. A carrier 59 is movable on the rail member 58. A holder 60 is attached to the carrier 59 and has stretching assembly 63 which consists of a fixed finger 61 and a movable finger 62. The movable finger is pivoted to the holder 60 at the intermediate portion with a pin 64. A finger drive cylinder 65 is secured to the holder 60 and has a piston rod 66 linked to the upper end of the movable finger 62 with a pin 67. A drive cylinder 68 is secured to the rail member 58 and has a piston rod 69 linked to the arm portion 70 of the carrier 59. The insulation displacing unit J includes an insulation displacing member 71 which is secured to the unit body 43.

As FIGS. 17-20 show, the insulation displacing member 71 has a blade portion 72 at the lower edge. The blade portion 72 has a front blade 72*a*, a middle blade 72*b*, a rear blade 72*c*, and a cut blade 72*d* which is a rear edge of the blade portion 72. The insulation displacing member 71 is placed between the positioning assembly 51 and the stretching assembly 63.

Figure 16:
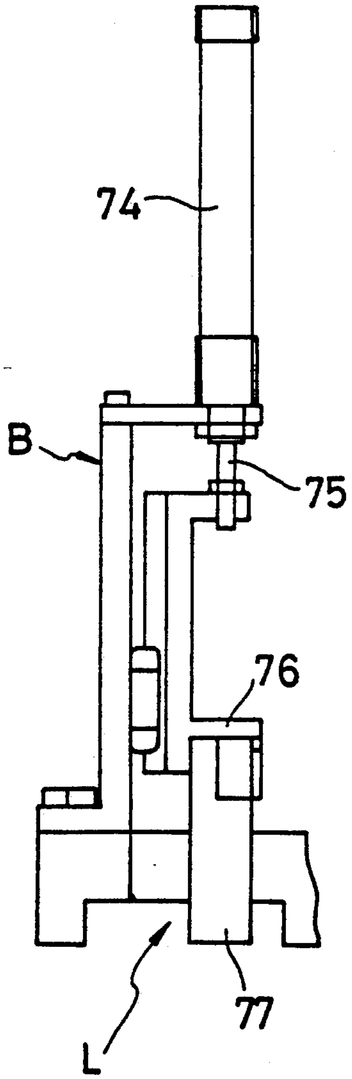
FIG. 16 is a side elevation viewed from the arrow XVI of FIG. 15.
Figure 15:
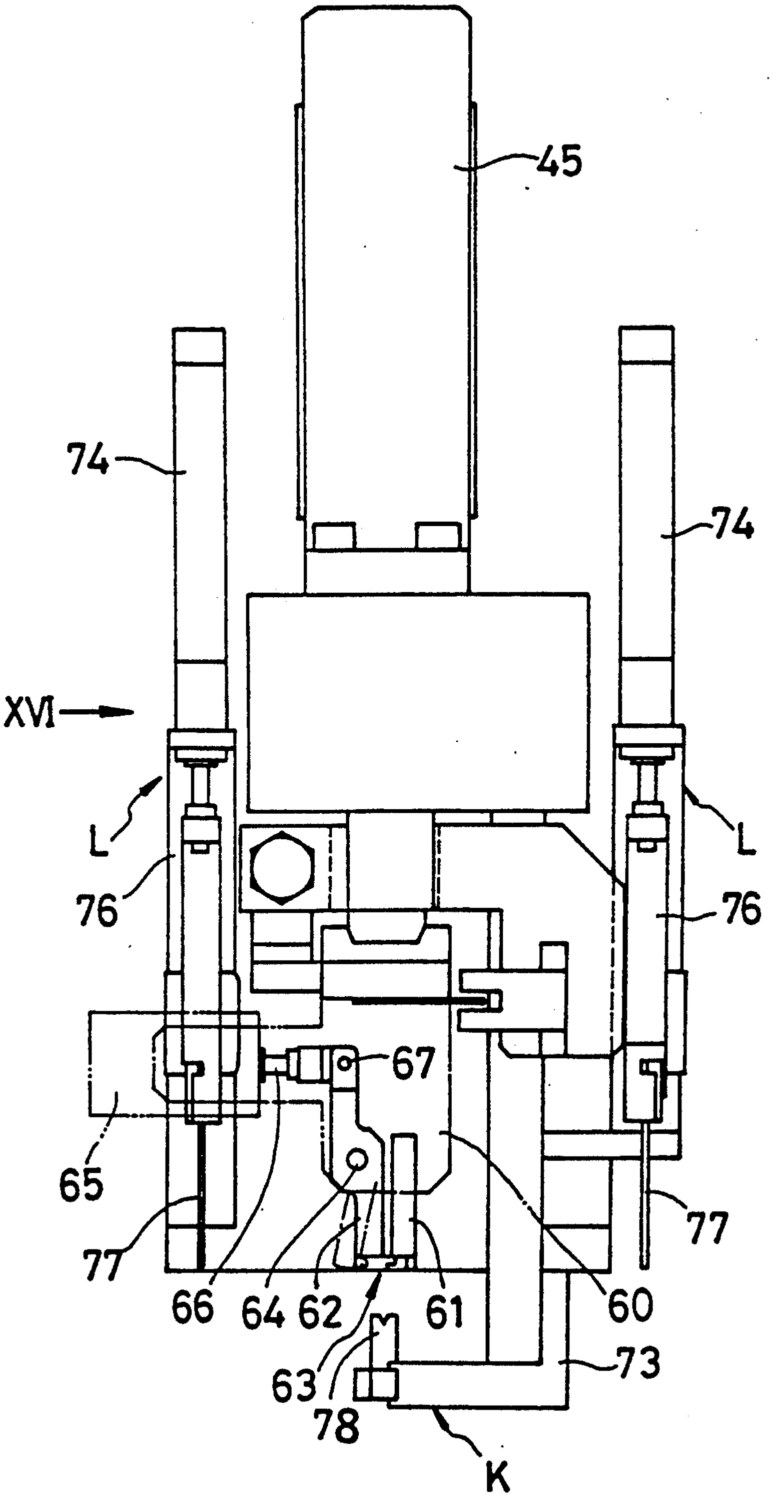
FIG. 15 is a rear elevation thereof.
Figure 18:
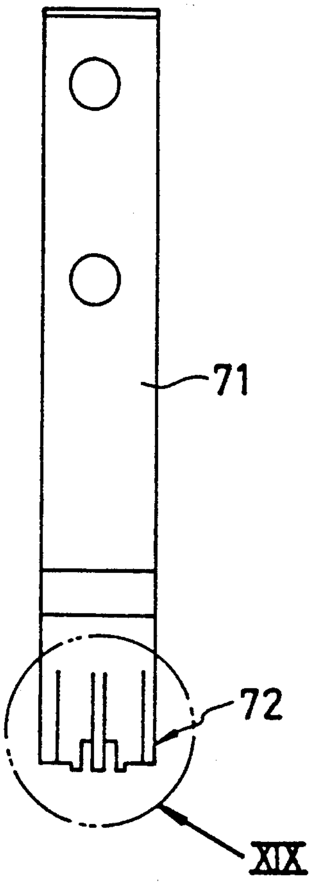
FIG. 18 is a side elevation thereof.
Figure 17:
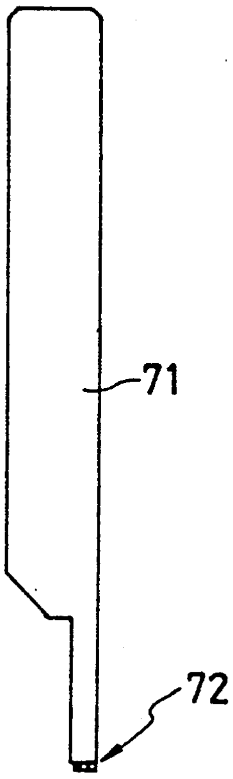
FIG. 17 is a front elevation of an insulation displacement blade of the cable loading machine.
Figure 19:
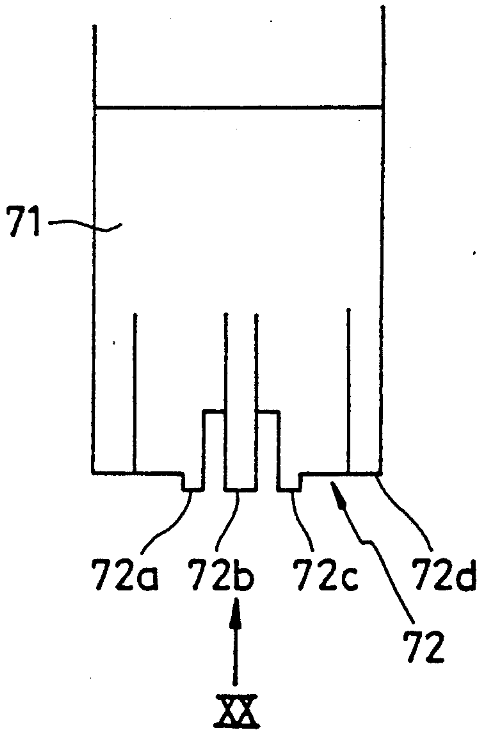
FIG. 19 is an expanded view of XIX of FIG. 18.
Figure 20:
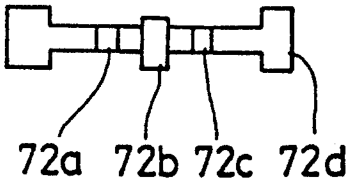
FIG. 20 is a bottom plan view from the arrow XX of FIG. 19.

A cutting unit K and a conductor press unit L are provided on the movable header unit B. The cutting unit K includes a holder 73 attached to the movable header unit B. A cutting blade 78 extends upwardly from the free end of the holder 73. As FIGS. 15 and 16 show, the conductor pressure unit L includes a pressure cylinder 74 secured to the movable header unit B. A holder 76 is attached to the lower end of a piston rod 75 of the pressure cylinder 74. A pressure plate 77 is secured to the lower end of the holder 76.

The loading of a multiconductor cable will now be described.

(1) A predetermined length of sheath is removed from each end of a multiconductor cable W having a number of conductors 80, and the individual conductors 80 are separated for loading by the loading machine according to the invention. The set table 2 is pulled out, and the connector 90 is set on the connector head 28. The multiconductor cable W is held on the set table 2 with the clamper 30.

Figure 21:
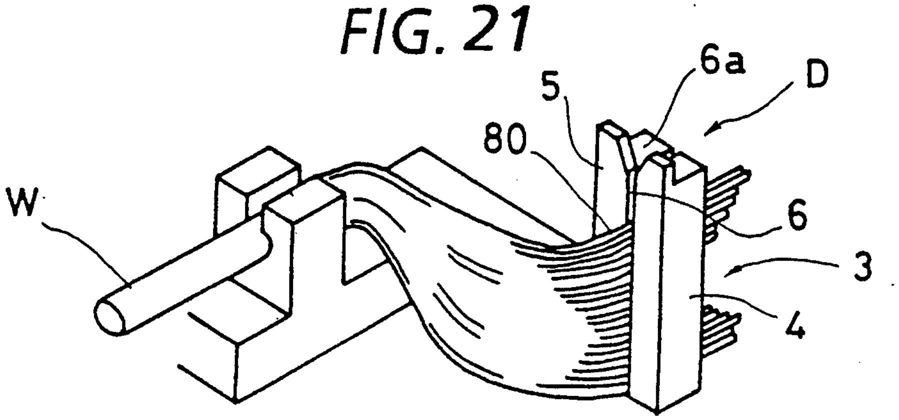
FIG. 21 is a perspective view showing conductors being inserted into the conductor separation unit.

(2) As FIG. 21 shows, the individual conductors 80 are inserted one at a time into the conductor receptor 6 of the conductor separation assembly 3 on the left-hand side. The set table is then inserted into the machine body 1.

(3) The movable header unit B is moved above the left-hand conductor separation unit D by operating the lateral conveyor unit G. More specifically, the drive motor 40 turns the threaded rod 36 via the pulley 42, the endless belt 43, and the pulley 38, which moves the movable header unit B via the nut member 35 in the lateral direction. The piston rod 75 of the pressure cylinder 74 is moved downwardly to insert the pressure plate 77 into the conductor receptor 6 for pressing down the aligned conductors 80.

Figure 22:
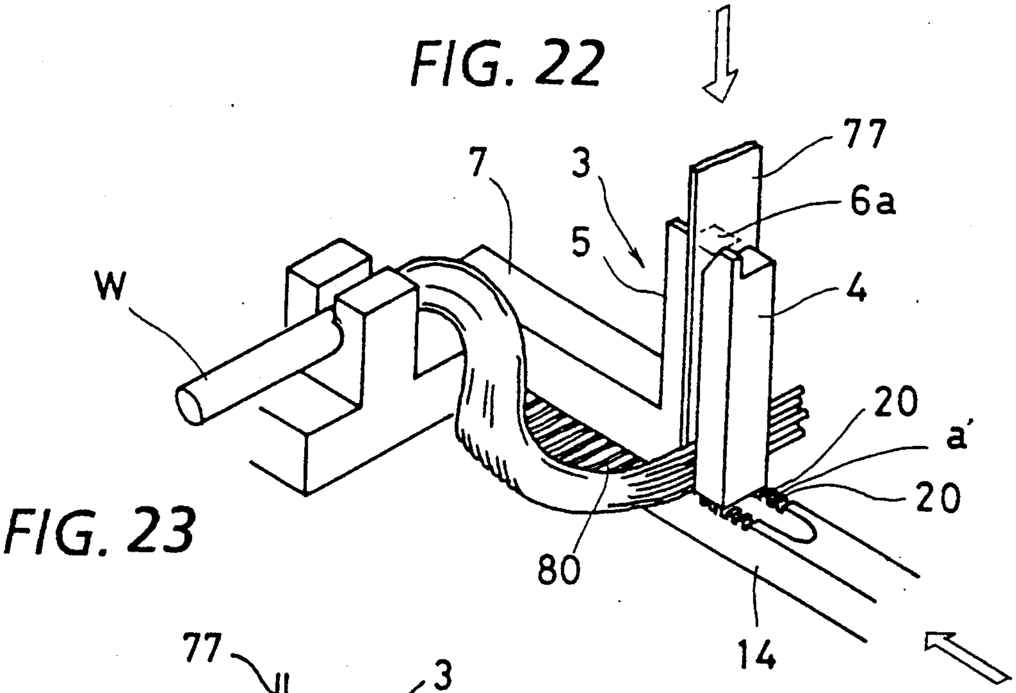
FIG. 22 is a perspective view showing the separation condition of the conductors.

(4) The separation comb 14 is then moved in the conductor separation direction (⅄) to insert each conductor 80 into a conductor receiving channel between the teeth 20 of the separation comb 14 for effecting conductor separation. See FIGS. 22 through 24.

(5) The pressure cylinder 74 of the conductor pressure unit L is operated to raise the pressure plate 77, and the lateral conveyor unit G moves the movable header unit B to a position above the right-hand conductor separation unit D.

Figure 25:
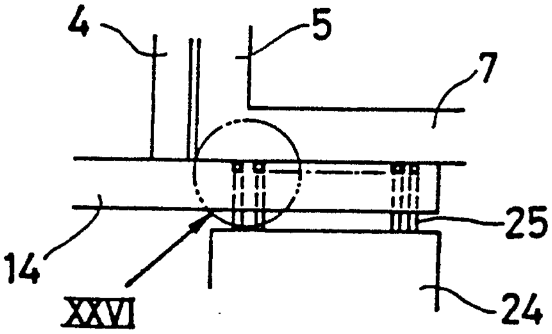
FIG. 25 is a front elevation showing probe pins contacting the separated conductor wires.
Figure 26:
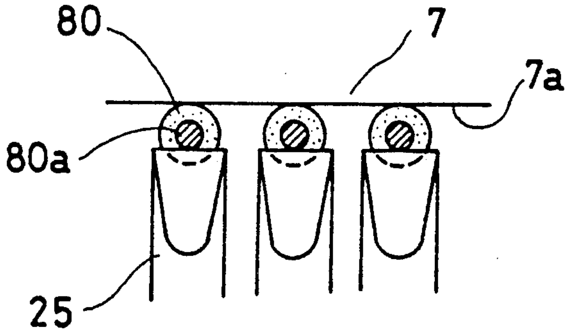
FIG. 26 is an expanded view of XXVI of FIG. 25.
Figure 30:
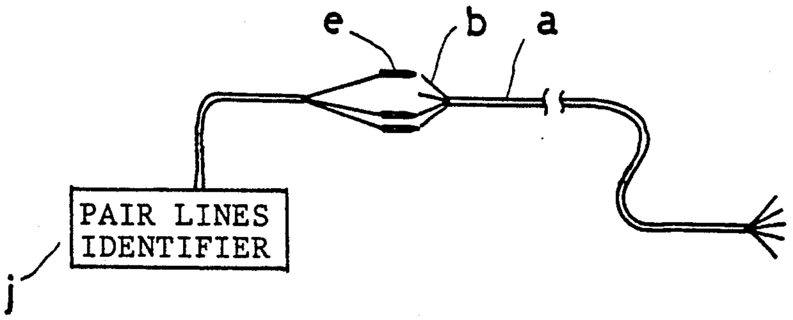
FIG. 30 illustrates how to identify the line pairs with a line pairs identifier.
Figure 31:
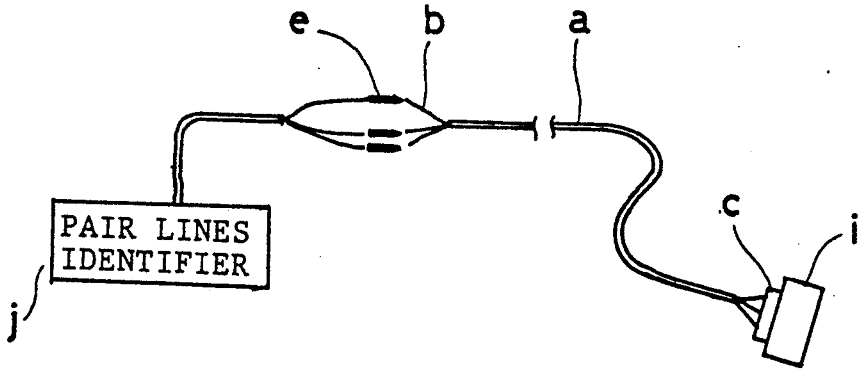
FIG. 31 illustrates how to identify the matched line numbers.

(6) The probe drive cylinder 21 is operated to raise the head 23 via the piston rod 22, which raises the probe 24 so that the probe pins 25 enter the split groove 18 of the conductor separation comb 14. Consequently, as FIGS. 25 and 26 show, the probe pins 25 penetrate into the insulated conductors 80 to contact the conductor wires 80*a*. The pair identifier such as shown in FIGS. 30 and 31 then identifies the line pairs and the line number match of the insulated conductors 80 and sends line pairs identification data to a control unit (not shown). As a result, the loading operation is controlled by the control unit.

(7) The probe drive cylinder 21 is then operated to move downwardly the probe pins 25 to separate them from the conductor wires 80*a*.

(8) The drive motor 11 of the conductor separation unit D is then turned backward so that the comb carrier 9 transports the conductor separation comb 14 in the direction opposite to the conductor separation direction (⅄), thereby positioning the left-most conductor 80 below the conductor receptor 6. At this point, the insulation displacing unit 47 stands by above the conductor receptor 6.

(9) The conductor push up unit F then raises the conductor push up member 26 to push up the left-most conductor 80 into the conductor receptor 6. The positioning assembly 51 and the stretching assembly 63 standing by above the conductor receptor 6 then grip the conductor 80. The finger cylinder 54 turns the movable finger 50 against the spring 53 in a closing direction to grip the conductor 80 between the movable finger 50 and the fixed finger 49. The finger actuation cylinder 65 turns the movable finger 62 in a closing direction to grip the conductor 80 between the movable finger 62 and the fixed finger 61. Upon completion of positioning and transferring the conductor to the positioning and stretching assemblies 51 and 63, the conductor push up plate 26 is moved downwardly.

(10) The drive cylinder 45 is operated to raise the pressure unit 47 while the drive cylinder 68 of the stretching unit I is operated to move backwardly the stretching finger 63 via the carrier 59 for removing a sag of the conductor 80.

(11) The insulation displacing unit 47 is laterally moved to a position above a predetermined terminal 90*a* of the connector 90 (lateral movement), the drive cylinder 45 is operated to move downwardly the insulation displacing unit 47 for connecting by insulation displacement the conductor 80 to the predetermined terminal 90*a* of the connector 90 and cutting the excessive length. More specifically, as FIG. 28 shows, when the insulation displacing unit 47 is moved to a position above the predetermined terminal 90*a* of the connector 90, the cutting blade 78 of the cutting unit K is placed behind the connector 90. The insulation displacing unit 47 is moved downwardly along with the positioning assembly 51 and the stretching assembly 63 so that the conductor 80 is inserted into the conductor guide 28*a* on the connector base 28 and then connected to the predetermined terminal 90*a* of the connector 90 with the pressure plate 71. The front, middle, and rear blades 72*a*, 72*b*, and 72*c* of the blade portion 72 press down the conductor 80 after the cutting blades 72*d* and 78 cut the excessive portion of the conductor 80.

(12) The insulation displacement unit 47 is then raised, and the stretching assembly 63 opens at the retreated position to release the excessive portion of the conductor 80 into a chute (not shown). The transport cylinder 68 is operated to move forwardly the stretching assembly 63 to the original position.

(13) The conductor separation comb 14 of the separation unit D is moved in the direction opposite to the separation direction (⁄), and the next conductor 80 is positioned below the conductor receptor 6. The operation is returned to the step (9) to repeat the loading operation for all of the conductors.

(14) After all of the conductors 80 are connected by insulation displacement to the terminals 90*a* of the connector, the set table 2 is pulled out and the connector 90 and the multiconductor cable W is taken out.

As has been described above, with the cable loading machine according to the invention, it is possible to utilize a line pairs identifier for simplifying the various functions from the conductor separation to the butch contact of conductors by the probe unit, thus increasing the productivity.

I claim:

1. A cable loading machine for connecting a plurality of insulated conductors of a multiconductor cable to terminals of a connector one at a time, which comprises:

a conductor separation unit having a conductor separation assembly with a gap sufficiently large to receive separated conductors;

a conductor pressure unit for applying a pressure on said conductors in said conductor separation assembly in a direction from an inlet to an outlet;

a conductor separation member having a row of teeth with conductor receiving channels therebetween and laterally movable over said conductor outlet for inserting said conductors pushed out of said outlet into said conductor receiving channels one at a time and positioning said inserted conductors on an outlet side of said conductor receiving channels;

a probe having probing pins for contact with said separated conductors to identify line pairs and line numbers; and a conductor push up unit for pushing up said conductor from said outlet side of said conductor receiving channels to said inlet of said conductor separation unit to transfer it to a gripping unit.

* * * * *